US00RE36178E

United States Patent [19]

Freudinger et al.

[11] E Patent Number: Re. 36,178

[45] Reissued Date of Patent: Apr. 6, 1999

[54] APPARATUS FOR DISPENSING A QUANTITY OF FLOWABLE MATERIAL

[76] Inventors: Mark J. Freudinger, 448 Division St., Peotone, Ill. 60468; David J. White, #2, Box 72 CA, Beecher, Ill. 60401

[21] Appl. No.: 843,891

[22] Filed: Apr. 17, 1997

Related U.S. Patent Documents

Reissue of:

[64] Patent No.: 5,407,102
Issued: Apr. 18, 1995
Appl. No.: 196,458
Filed: Feb. 15, 1994

[51] Int. Cl.[6] ..... B65D 88/54

[52] U.S. Cl. ..... 222/309; 222/330; 222/564; 118/25

[58] Field of Search ..... 222/309, 330, 222/334, 382, 564; 118/25; 239/504, 553.3, 555.5

[56] References Cited

U.S. PATENT DOCUMENTS

| | | |
|---|---|---|
| 2,835,583 | 5/1958 | Higgins et al. . |
| 3,153,392 | 10/1964 | Verona . |
| 3,221,672 | 12/1965 | Falco . |
| 3,358,618 | 12/1967 | Vetta . |
| 3,408,981 | 11/1968 | Poppe et al. . |
| 3,505,963 | 4/1970 | Westling . |
| 3,547,052 | 12/1970 | Artiaga et al. . |
| 3,685,744 | 8/1972 | Ludy, Jr. . |
| 3,735,692 | 5/1973 | Marchignoni . |
| 3,908,584 | 9/1975 | Raque . |
| 4,088,249 | 5/1978 | Westling . |
| 4,271,200 | 6/1981 | Hempenius et al. . |
| 4,771,726 | 9/1988 | Fitch, Jr. . |
| 4,801,097 | 1/1989 | Fitch, Jr. . |
| 4,814,274 | 3/1989 | Shioya et al. . |
| 4,974,754 | 12/1990 | Wirz . |
| 5,088,631 | 2/1992 | Torterotot . |
| 5,171,367 | 12/1992 | Fitch, Jr. . |
| 5,309,958 | 5/1994 | Ueda et al. . |

OTHER PUBLICATIONS

Correspondence between Pizzamatic Corporation and Quantum Technical Services, Inc (Jan. 14, 1998–Mar. 12, 1998).
Drawings (4 sheets) of Pizzamatic Sauce Applicator Model No. 2100A, Serial No. 0019–12, Mar. 12, 1998.
Copies of photographs (3 sheets) of Pizzamatic Sauce Applicator Model No. 2100A, Serial No. 0019–12.

*Primary Examiner*—Gregory L. Huson
*Attorney, Agent, or Firm*—Jones, Day, Reavis & Pogue

[57] ABSTRACT

Viscous flowable material dispensing apparatus for dispensing viscous flowable material such as food material. The apparatus is provided with a supply manifold for receiving and distributing the viscous material with air actuated reciprocating pump connected to the manifold to force the material therethrough, facilitated by one way inlet and outlet valves in the manifold. A pattern plate adapted to receive the material from the manifold into a flat chamber with a dispersing pattern plate supported in the chamber to disperse the material throughout the chamber. A pattern plate covering the plate chamber to receive the dispersed material and dispense same in a pattern over object to receive the material. Pneumatic control valves are utilized for operating the pump to continuously provide repeated movement of material through the apparatus.

45 Claims, 6 Drawing Sheets

APPARATUS FOR DISPENSING A QUANTITY OF FLOWABLE MATERIAL

Matter enclosed in heavy brackets [ ] appears in the original patent but forms no part of this reissue specification; matter printed in italics indicates the additions made by reissue.

BACKGROUND OF THE INVENTION

Existing known types of apparatus for dispensing flowable materials often provide a single inlet or supply valve that requires separate means for actuating same and which thereby is not directly operable by the amount of source to be applied by the apparatus. This type of apparatus operation requires a synchronization of separate sub-apparatus to try to control the amount of material entering the apparatus relative to that to be dispensed by the apparatus. This tends to cause a lack of unison of action and corresponding flow through the apparatus and which, in turn, detracts from the accuracy and control of flow of material.

Also, existing known types of apparatus for dispensing flowable materials often have a relatively small diameter, and relatively long stroke, piston pump sub-apparatus for pumping material through the apparatus; and a separately actuatable and adjustable much larger cross-sectional area for an ultimate dispensing pump apparatus piston pump structure for dispensing material from the apparatus. In this situation, a small adjustment of the movement of the separately actuated larger area dispensing sub-apparatus can result in a large corresponding variation in the amount of the material ultimately dispensed, defeating the desirable precision often required by a dispensing apparatus.

Some existing known types of apparatus for dispensing flowable material even require a mold plate with a shear plate and knife plate to provide positive cyclic dispensing in lieu of provision of structure to provide precision in the amount of material to be dispensing.

Still further, the existing known types of apparatus for dispensing flowable material usually provide a controlled source of air under pressure for directly operating the material dispensing structures which provide an undesirable source of possible direct contamination of the material to be dispensed, particularly when dispensing food material.

Also, existing known types of apparatus, although having a sub-apparatus dispensing chamber for ultimately dispensing the flowable material, do not provide any appropriate means for diffusing the material throughout the sub-apparatus dispensing chamber to augment the even and accurate dispensing of material, over a given area, from the sub-apparatus ultimate dispensing structure.

SUMMARY OF THE INVENTION

This invention relates to an apparatus for accurately dispensing a precise quantity of a source of viscous flowable material, such as food material, uniformly and efficiently in a certain precise pattern and quantity over and onto a given area of an object. The apparatus of this invention provides a supply manifold adapted with a self-actuating one-way inlet valve and a self-actuating one-way outlet valve to automatically receive viscous material in only one direction therethrough by virtue of the one-way valves. A reciprocating dual piston pump is laterally connected to the supply manifold and is selectively actuatable to alternately withdraw a precise amount of material from the supply manifold to draw the material thereinto through said one-way inlet valve and thereafter reinject the precise amount of material into the manifold to force the precise amount of material out of the supply manifold through the one-way outlet valve and into a chamber of a dispensing manifold assembly.

The dispensing manifold chamber of this invention is adapted with a pattern plate chamber to receive the material over a given area and in the precise given volume and is provided with a means for diffusing the material within the chamber to provide precise and even distribution of material in the chamber. An apertured pattern plate distributes the material from the dispensing plate manifold chamber in a given even pattern over and onto the object to which the material is to be applied.

In addition, the structure of this invention provides a precise and adjustable pump for moving all of the material in unison through the apparatus to augment the precise distribution of the material. The valves for providing one-way passage of material in unison through the supply manifold are spring biased to a normally closed position, and the valves are provided with a passage therethrough separate and apart from the biasing mechanism to preclude contamination of the material from the lubrication or other impurities of the biasing mechanism.

Also, the structure of the apparatus of this invention provides that the pump cylinders are of a much smaller diameter than the diameter of the dispensing manifold chamber and the pattern plate and the dispensing manifold and chamber are not actuated as pistons or the like to cause dispensing whereby adjustments of the structure of the piston pump of this invention will provide a single precise adjustment for the entire apparatus.

It is a further object of this invention to provide a dual reciprocating piston pump arrangement, with one piston reciprocally actuated by a simply controlled source of air pressure which piston is separate and apart from the piston which is actually reciprocally pumping material to separate the air of the air actuation source from the material actuation and thereby avoiding contamination from the source of air under pressure with the material being pumped.

Also, the stroke of the air controlled pump piston is provided with a fine adjustment to further provide a precise control of the material pumped in unison through the apparatus of this invention.

Other advantages and other novel aspects of the invention will become apparent upon consideration of the following detailed description in conjunction with the accompanying drawings wherein.

Figure 1:
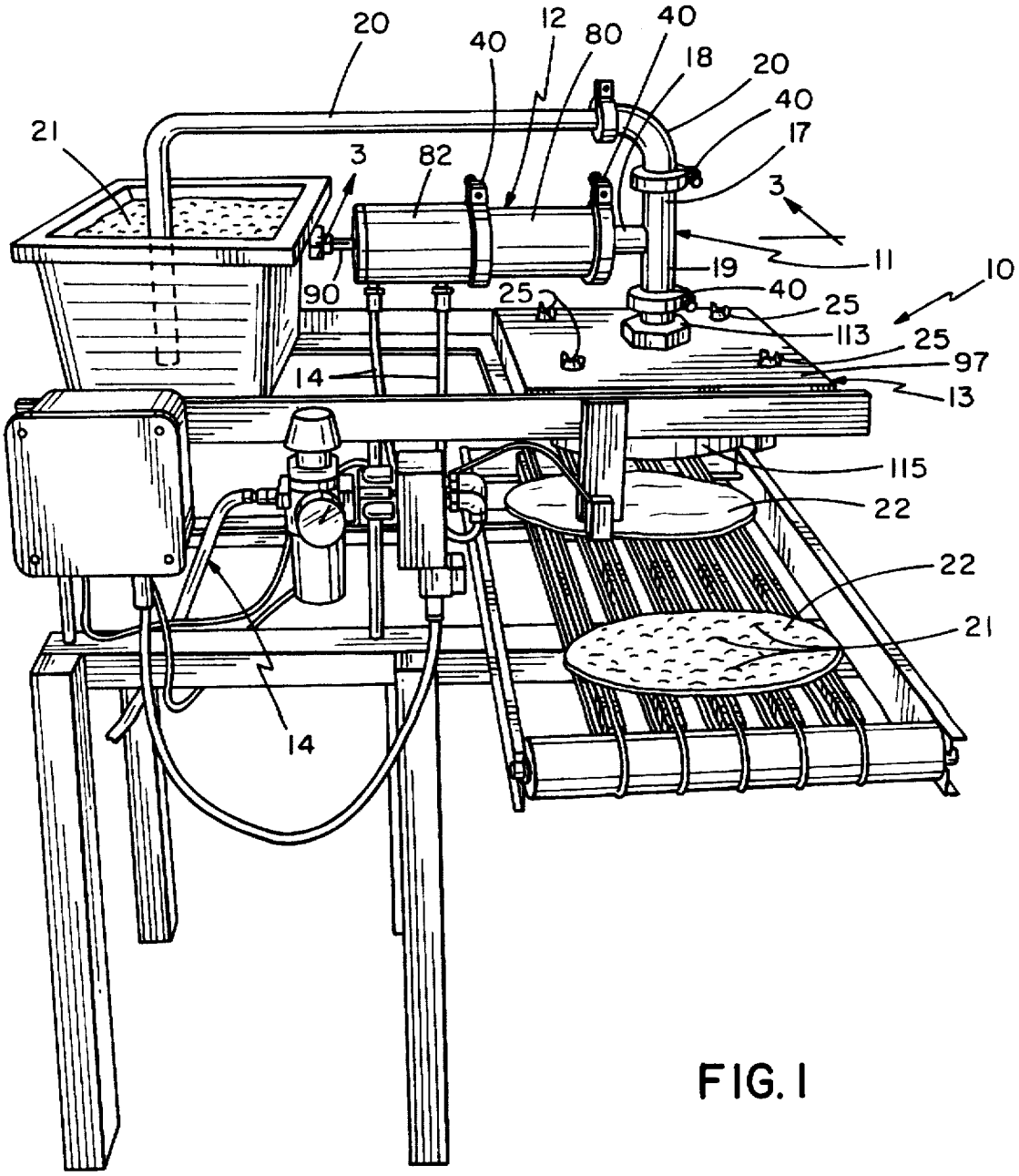
FIG. 1 is a general perspective illustration of the entire apparatus of the invention as it might be applied to a production line.

The apparatus for accurately dispensing a precise quantity of a source of viscous flowable material or media 21 uniformly in a certain pattern over and onto a given area of an object 22 (FIG. 1) of this invention is generally illustrated by the numeral 10 (FIGS. 1, 3 & 7), and includes generally a supply manifold assembly 11, a reciprocating piston pump assembly 12, a dispensing manifold assembly 13 and an alternating double source of flowable media, such as air, vegetable oil, petroleum oil, etc., under pressure 14.

Supply manifold 11 has a T-shaped passageway 16 having inlet passage portion 17, pump secondary passage portion 18, and an outlet passage portion 19. Inlet passage portion 17 is aligned with a material supply conduit passage 20 having a source of viscous material 21 (FIGS. 1, 3–5 & 7) through inlet valve assembly 15. Inlet valve assembly 15 is slidably mounted in both supply passage 20 and passage 16 of supply manifold inlet portion 17 to provide one-way flow of viscous material 21 from supply passage 20 to supply manifold 11.

Figure 5:
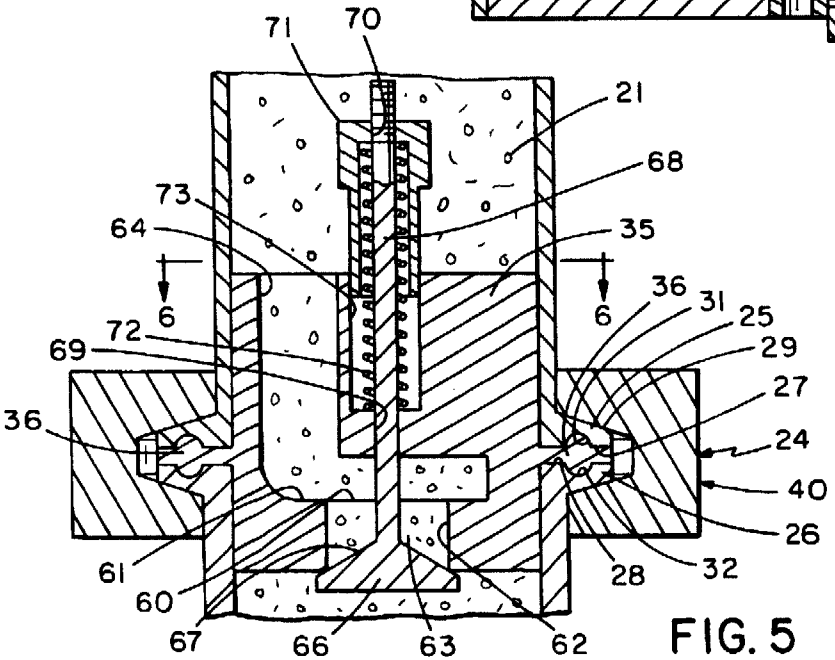
FIG. 5 is a longitudinal sectional view through the center of the inlet and outlet valves showing the spring bias isolated from the material passage.

A conduit connection apparatus generally designated by numeral 24 (FIG. 5) is shown in detail and includes adjacent matching flanges 25 and 26 (FIG. 5) having respective adjacent radial surfaces 27 and 28 and respective beveled surfaces 29 and 30. Radial surfaces 27 and 28 have concentric respective annular alignment grooves 31 and 32 (FIG. 5).

Inlet valve assembly 15 has valve body 35 (FIG. 5) with a radial spacing and alignment flange 36 having an annular alignment bead 37 on both sides thereof and structured to complementally and concentrically fit into respective annular groves 31 and 32 to space apart and concentrically align passage 16 of supply manifold 11 and supply conduit 20.

A clamp assembly, generally designated by numeral 40 (FIG. 2) is provided to maintain supply conduit 20 connected to supply manifold 11, via inlet valve body flange 36 and to longitudinally position inlet valve body 36 in supply conduit 20 and in supply manifold chamber inlet portion 17.

Articulated clamp assembly 40 (FIG. 2) is provided with a semicircular body portion 41 and two semicircular locking arm portions 42 and 43 respectively pivotally mounted at pins 44 and 45 and which respectively articulate about pins 44 and 45 to form a completely circular clamp (FIGS. 3–5 and 7). Clamp elements 41, 42 and 43 have respective annular grooves 46, 47 and 48 thereof (FIG. 5) configured to be positioned over flanges such as 25 and 26 in complemental engagement with surfaces 29 and 30 of respective flanges 25 and 26 of supply passage 20 and supply manifold inlet portion 17.

A clamp thumb screw 50 (FIG. 2) has a threaded shaft 51 positioned through an aperture 52 in locking a projection 53. A threaded aperture 54 is provided in a locking projection 55 of portion 43 and is adapted to threadably receive threaded shaft 51 of thumb screw 50.

When clamp 40 is placed around flanges 25 and 26, and arms 42 and 43 are respectively pivoted about pins 42 and 43 (FIG. 2) to bring locking projections in adjacent position with each other around flanges 25 and 26, thumb screw shaft 51 can be thumb screwed into threaded opening 54 of projection 55 to tighten clamp 40 around adjacent flanges 25 and 26 (FIG. 5). This releasably retains supply conduit 20 to supply manifold 11 via valve body flange 36 within source passage 20 and supply manifold inlet portion 17 (FIGS. 3–5 & 7).

Inlet valve body 35 is provided with a valve outlet opening 60 formed by the convergence of radial surface 61 and cylindrical surface 62 formed by cylindrical passage 63 and is in communication with a separate passage 64 to provide a complete material passage through valve body 35.

A valve plug 66 (FIG. 5) has a tapered inlet seating surface 67. A plug stem 68 is slidably mounted in aperture 69 of valve body 35 and threadably mounted in threaded aperture 70 of a valve cap 71. Cap 71 has cylindrical surface 72 slidably mounted in aperture 73 of valve body 35. Stem 68 is free to move longitudinally within aperture 69 of valve body 35 and with said valve cap 71 in aperture 73.

A compression spring 72 (FIG. 5) is provided in body aperture 73 and in a spring retained cap aperture 74 to respectively urge valve cap 71 and valve plug and stem 66 and 68 upwardly toward the material source to cause tapered plug surface 67 to engage converging surfaces 61 and 62 of outlet opening 60 of inlet valve 15 to normally close valve assembly 15.

Figure 6:
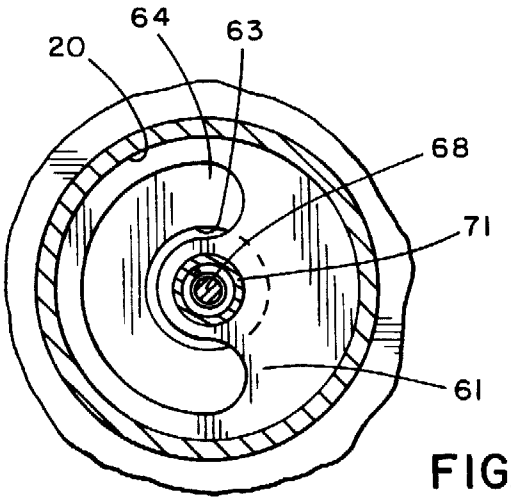
FIG. 6 is a lateral sectional view taken along line 6—6 of FIG. 5 showing the separate material passage of the inlet and outlet valves.

When viscous material 21 is removed downwardly from plug 66, supply material 21 will be drawn through valve 15, against the bias of spring 72, to flow from material source 20 through separate passage 64 (FIGS. 5 & 6) and outlet opening 63 into supply manifold passage 11.

Pump 12 (FIGS. 1, 3, 4 & 7) is provided with a material pumping cylinder body 80 having cylinder chamber cavity 81, and a pump actuating cylinder body 82 having an air cylindrical chamber cavity 83. Pump cylinder cavity 81 is axially connected to, and in material passing communication with, supply manifold 11 via material communication passageway 16 by a conduit connecting clamp structure 24a as described above in regard to clamp 40.

A pump piston 85 is reciprocally slidably mounted in cylinder 81 of pump body 80 and is provided with a connecting rod 86 extending longitudinally away from passage portion 18. Pump cylinder body 80 and actuating cylinder body 82 are axially connected by a conduit connecting clamp structure 24b as described above in regard to clamp 40.

Air cylinder actuating body 82 (FIGS. 3, 4 & 7) is provided with a piston 87 in cylinder 83 and a connecting rod 88 which, in turn, is connected to pump piston connecting rod 86 to impart similar reciprocal movement of pump piston 85 in pump cylinder body 80. A thumb screw 90 having a threaded body 91 is threadably mounted in a threaded axial aperture 92 of air cylinder body 82 to adjust the limit of movement to the left, of air piston 87 to similarly adjust the stroke of pump piston 85 and, in turn, the amount of material to be pumped and dispensed.

An alternating source of air under pressure is selectively provided by the known type of air valves (not shown) through air fittings [91] *93* and [92] *94* of air cylinder 82 (FIGS. 3, 4 & 7) allowing air to pass selectively into, or out of, air cylinder 81 through each *of* fittings [91] *93* and [92]

*94*. It should be noted that by alternatively supplying air under pressure to one or the other of fittings [91] *93* and [92] *94* and inversely releasing air under pressure to fittings [92] *94* or [91] *93*, air piston 87 will be alternately forced in alternate axial directions to similarly alternately actuate pump piston 85.

Dispensing manifold assembly (FIGS. 2, 3, & 8–10) includes, generally: inlet passage member 95 having a conduit 96; manifold plate 97; diffuser plate 98; and pattern plate chamber 99. Outlet valve 15a, which is identical to inlet valve 15, as above described, is positioned within supply manifold conduit chamber 16 in outlet portion 19 and dispensing manifold conduit 96 in the identical manner that identical inlet valve 15 is positioned between supply 20 and supply manifold 11.

Supply manifold outlet portion 19 is axially retained and aligned with passage 96 of inlet passage member 95 of dispensing manifold 15 by a conduit connection structural apparatus 24c which is identical to conduit structural apparatus 24 above described in detail. Outlet valve 15a is thereby positioned to allow material to flow, downwardly only, from supply manifold 11 into the inlet passage 96 of dispensing manifold 13 against the spring biased valve of outlet valve 15a.

Inlet passage portion 95 is retained in aperture 110 of a manifold plate 97 by virtue of an annular flange 111 thereof seated in an annular groove 112 and secured by cap 113 threadably mounted on the upper periphery of inlet member 95. Pattern plate 115 has an approximate horizontal area comparable to the area of chamber 99.

Figure 7:
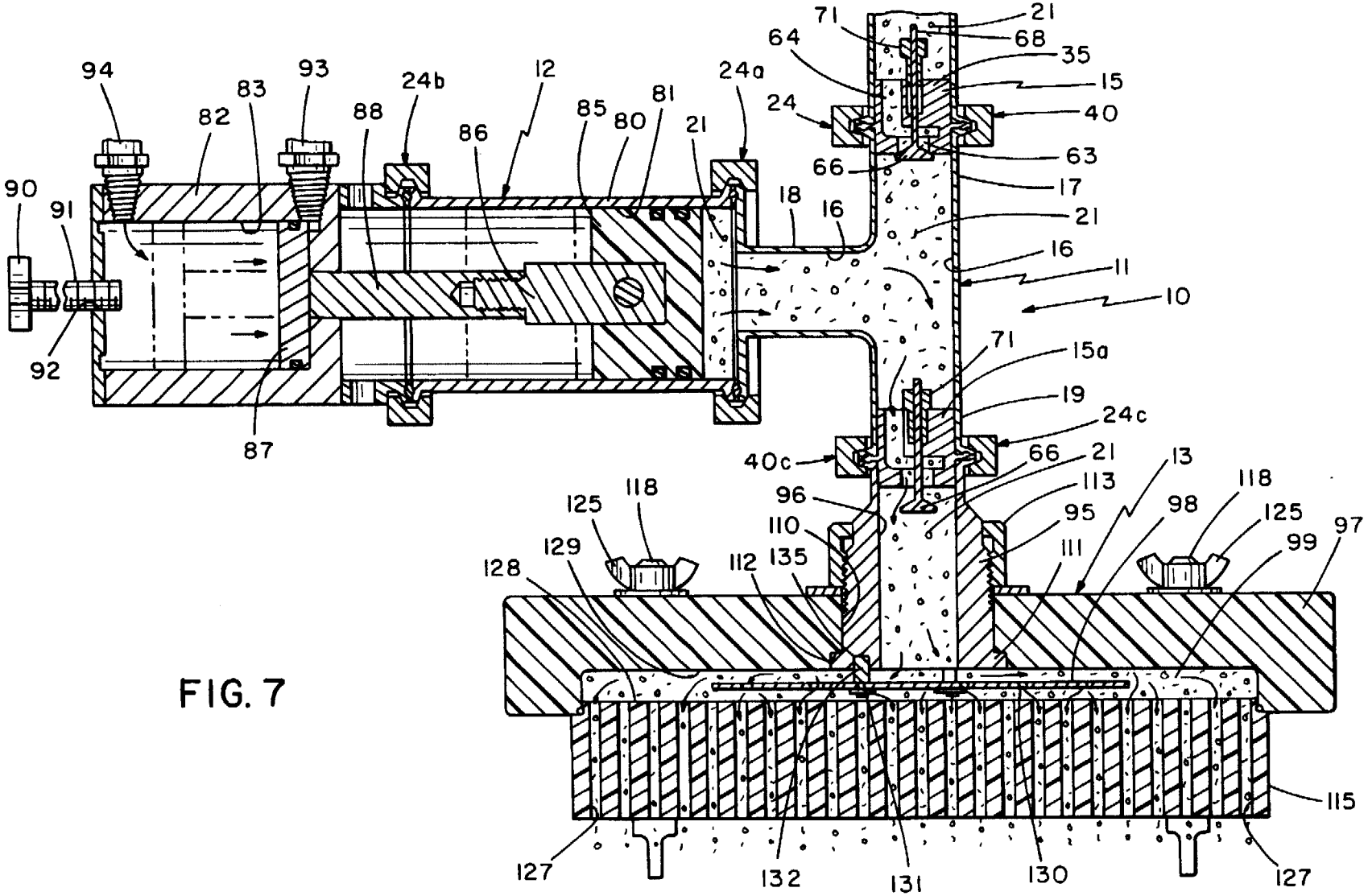
FIG. 7 is a sectioned view of the apparatus of this invention showing the pump expelling material in unison through the supply manifold, outlet valve, passage, dispensing manifold, diffuser plate, and pattern plate.
Figure 8:
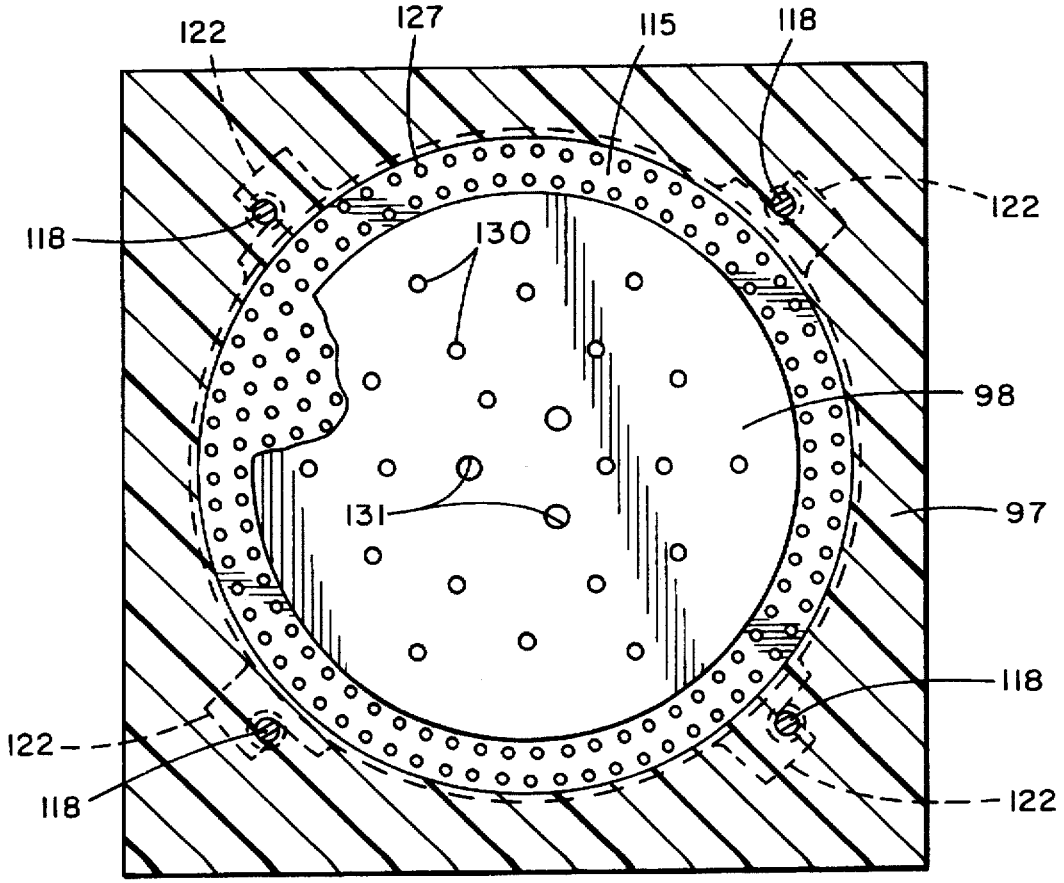
FIG. 8 is a sectional view taken along line 8—8 of FIG. 3 showing the top surface of the diffuser plate as it appears above the pattern plate in the dispensing manifold chamber.
Figure 9:
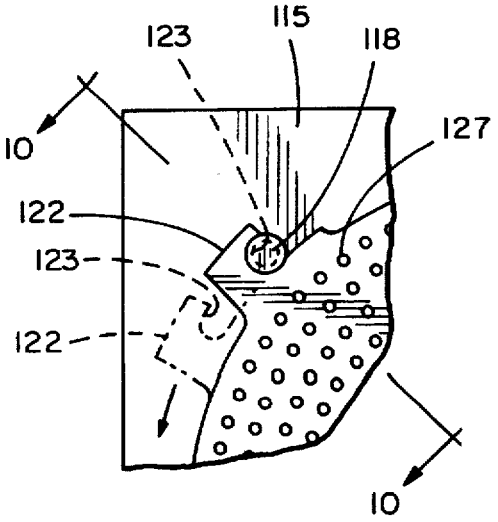
FIG. 9 is a partial view of the bottom of the pattern plate and dispensing manifold showing the mechanism for attaching and detaching the pattern plate with the dispensing manifold.
Figure 10:
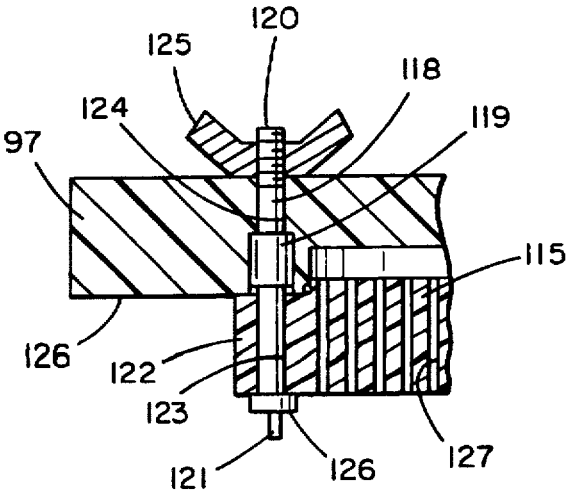
FIG. 10 is a partial sectional view taken along line 10—10 of FIG. 9 showing the vertical details of mechanism for attaching and detaching the pattern plate with the dispensing manifold.

Manifold plate chamber 99 (FIGS. 2, 3 & 7–10) is enclosed by a pattern plate 115 having a peripheral groove 116 seated over the lower inner perimeter edge 117 of manifold plate chamber 99. Pattern plate 115 is secured in said position by studs 118 (FIG. 10). Studs 118 have a shaft with an enlarged diameter portion 119, a threaded end portion 120, and an axially extending flat finger hold 121 on the end opposite threads 120. Pattern plate 115 is provided with locking projections 122 having a slot 123 adapted to respectively laterally receive studs 118 (FIGS. 2, 8 & 9).

Figure 2:
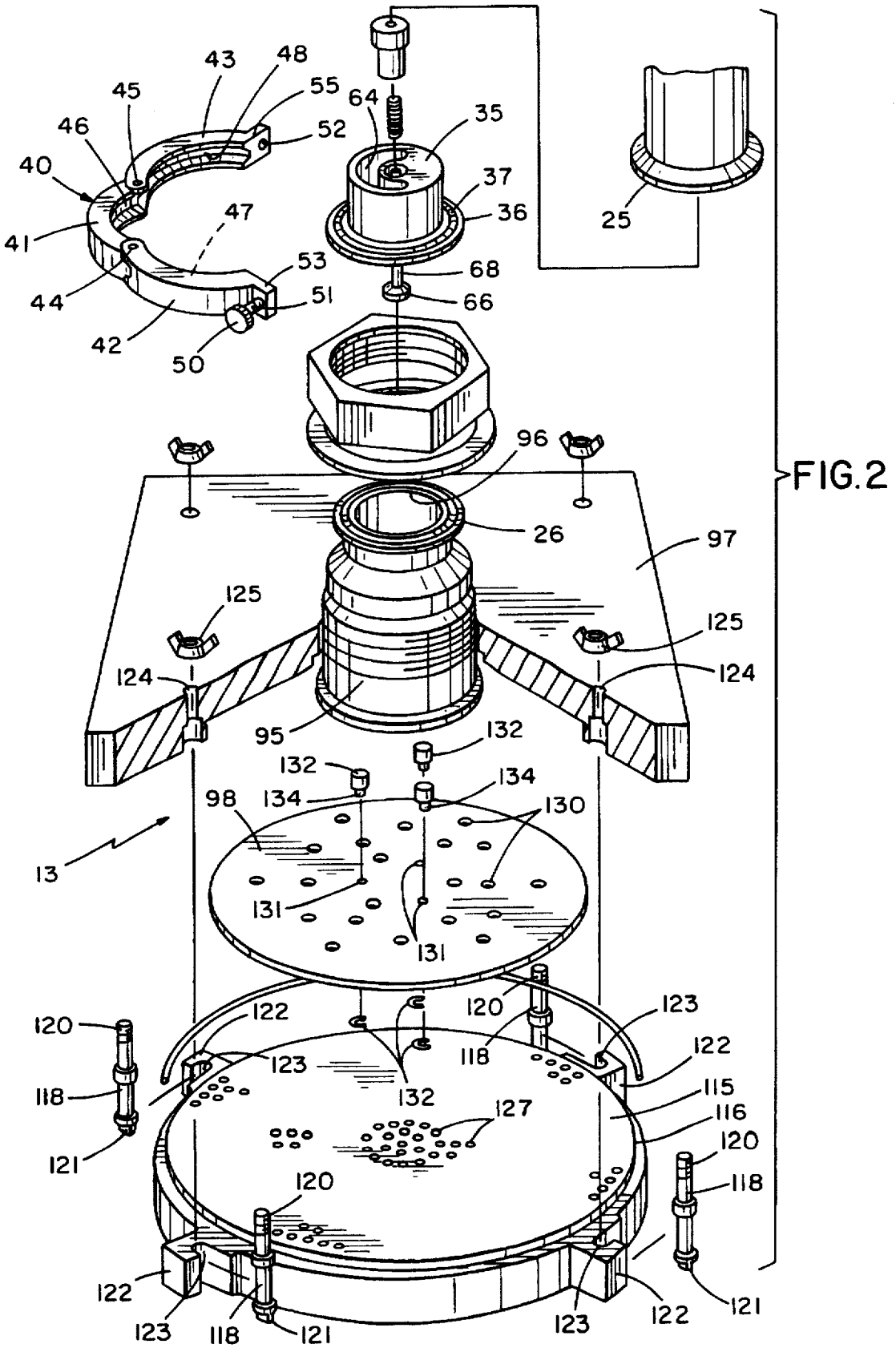
FIG. 2 is an exploded view of the specific dispensing structure of the apparatus of this invention.

In particular, pattern plate 115 is first loosely attached to the manifold plate 97 by studs 118 by inserting threaded stud end 120 through respective apertures 124 in manifold plate 97 (FIGS. 2 and 10). Studs 118 are retained in manifold plate 97 by wing nuts 125 threaded onto end 120 of studs 118 (FIG. 10). This provides for loose retention of studs 118 in manifold plate 97 with the lower ends 121 of stud 118 exposed below manifold plate 97 in position to be accepted into respective grooves 123 of pattern plate lock projections 122 (FIGS. 2, 8 & 9).

In this regard, to assemble pattern plate 115 to manifold plate, pattern plate 115 is positioned against lower surface 126 of manifold plate 97 with peripheral groove 116 seated in peripheral edge 117 (FIG. 10). Pattern plate 115 is thereupon rotated clockwise (FIG. 9) to cause slots 123 of projections 122 to receive respective stud shafts 118 therein (FIGS. 8–10) between surface 126 of manifold plate 97 and upper surface 128 of a flange 126 of respective studs 118.

Nuts 125 are then tightened to retain pattern plate 115 in position (FIGS. 3 & 7–10). Pattern plate 115 is *provided* with a given pattern of apertures 127 (FIGS. 2, 3 & 7–10). Pattern plate 115 is provided with a given thickness to provide apertures 127 with sufficient length to, in turn, provide sufficient friction between the material to be passed therethrough depending on the viscosity of the material to normally retain the material therein in lieu of any force from pump 12 of the material of the system.

Diffuser plate 98 is a thin plate having a predetermined pattern of material passage apertures [131] *130* (FIGS. 2, 3, 7 & 8). Diffuser plate 98 is also provided with retaining apertures 131 therethrough (FIGS. 2, 3, 7 & 8) having mounting posts 132 secured therein at the lower end thereof by C retainers 133 (FIG. 2) inserted in grooves 134 in posts 132 positioned in retaining aperture 131. Posts 132 are attached to manifold plate 97 in apertures 135 (FIGS. 3 & 7) to space diffuser plate 98 in manifold plate chamber 99 of manifold plate 97 between upper surface 128 of pattern plate 115 and lower surface 129 of manifold plate 97 of manifold plate chamber 99. Diffuser plate 98 thus provides a spreading and diffusing distributing action of material received from inlet passage member 95 into manifold plate chamber 99 by providing a spaced obstacle to such passage yet providing distributing passage apertures 131 therethrough to spread and distribute material by passing material onto, around and therethrough to pattern plate 115.

Figure 3:
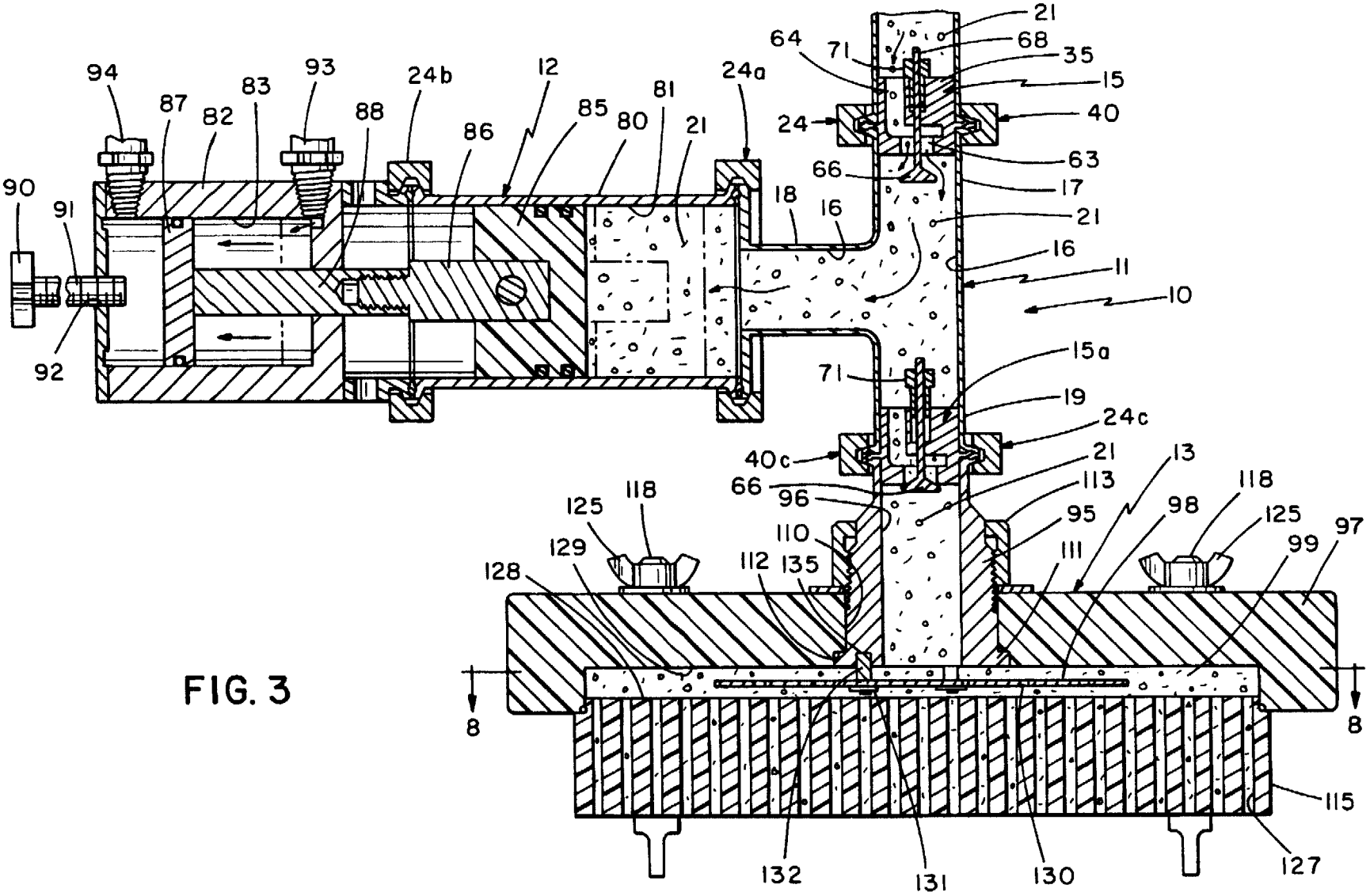
FIG. 3 is a sectioned view taken along line 3—3 of FIG. 1, of the supply manifold, dual piston pump and the specific dispensing structure showing the pump withdrawing material from the source through a one-way inlet valve of the supply manifold and into the cylinder of the manifold pump.
Figure 4:
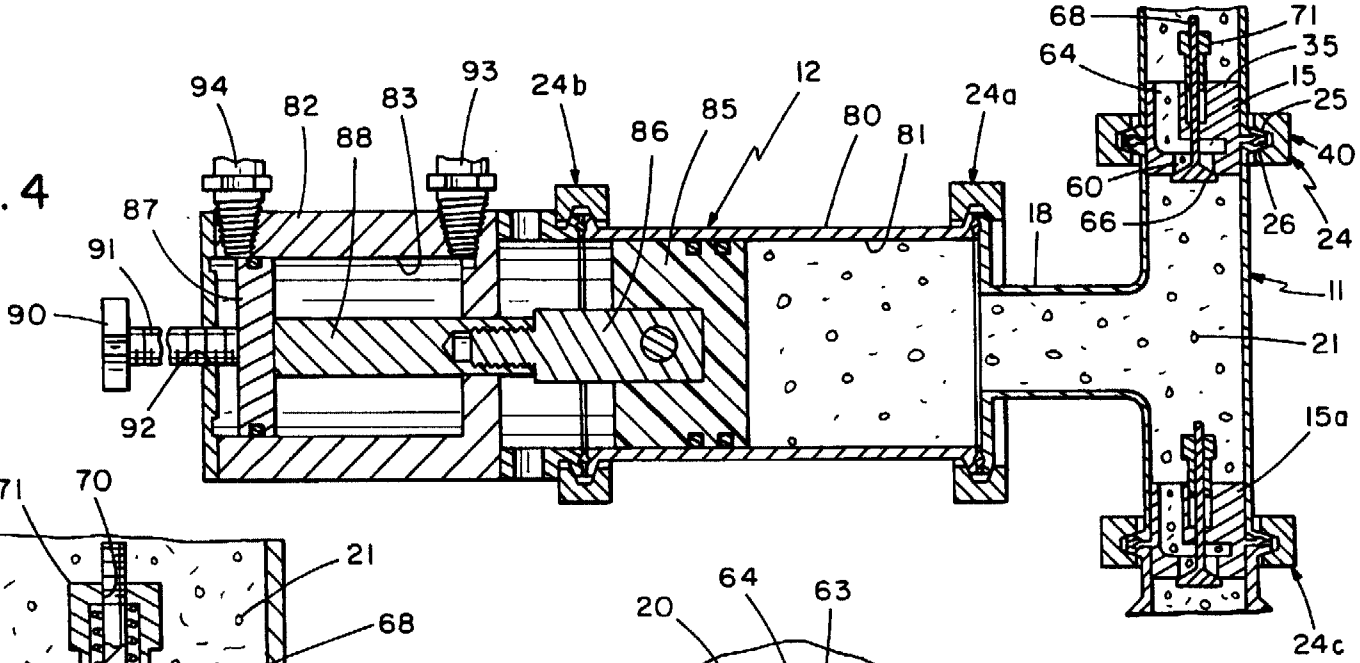
FIG. 4 is a sectional view of the supply manifold and pump showing the pump pistons in position to eject material from the pump.

In operation, the apparatus of this invention for dispensing flowable materials is accomplished by a single pump generally designated by the numeral 12 which is actuated by a simple on/off alternating source of air under pressure. In particular, a source of material 21 (FIGS. 1, 3 and 7) is provided as shown initially in FIG. 1 and supplied by supply conduit 20 to inlet valve 15 (FIGS. 3, 5 & 7).

A complete cycle of the invention can begin with the end of one cycle (FIG. 7) with the material pump piston 85 to the right in cavity 81 of pump body 80 with the air actuating piston 87 also to the right in air cylinder cavity 83 of actuating cylinder body 82. Initially to operate the machine, supply manifold 11 must be fully charged with viscous material 21 which is accomplished by cycling the apparatus as hereinafter explained. This cycling action will draw flowable material 21 into the apparatus to charge the apparatus of this invention.

To initiate action once supply manifold 11 is fully charged, air is introduced through fitting [91] *93* either manually by air valves or by automatic valve means, of various known types, into cylinder 83 to the right of air piston 87. Piston 87 is thereby urged to the left (FIGS. 3 & 7) exhausting air to the left of piston 87, through air fitting [92] *94*, until piston 87 engages stop shaft 90. This will draw viscous material from supply 21 into supply manifold 11 and pump cylinder 81 as indicated (FIGS. 3 & 4) through passages 64 and 63 of inlet valve 15, passage 16 of supply manifold 11 against the bias in valve 15.

Thereafter, the air is manually or automatically turned off from fitting [91] *93* to allow air to escape from air cylinder 83 via fitting [91] *93*. Air under pressure is then similarly manually, or by such known automatic means, applied through fitting [92] *94* into air cylinder 83 to the left (FIG. 4) of air actuated piston 87. Piston 87 and its connecting rod 88 will thereby be urged to the right until air piston 87 engages the right end of air piston cylinder 83 (FIG. 7).

Simultaneously, pump piston 85 will be urged to the right via connecting rods 88 and 86. During the process of [movement] *moving* piston 87 from the left (FIG. 4) to the right (FIG. 7) viscous material contained in pump cylinder 81 will be ejected into supply manifold 11 through secondary passage portion 18 (FIG. 7), and out through one-way value 15a via passages identical with 64 and 67 of one-way inlet valve 15 against the bias of outlet valve 15a.

The pressure of the injection of viscous fluid will cause plug 66 to move off of converging surface seat such as that of 61 of inlet valve 15. This cycle of action causes eventual one-way flow from supply 21 and through supply manifold 11 by virtue of the fact that inlet valve 15 will operate only to allow viscous fluid material to enter supply manifold 11, and outlet valve 15a will only allow the viscous material to flow out of supply manifold 11 when pumping piston is moved to the right. Similarly, viscous material can only flow from supply 21 into supply manifold 11 and not out of supply manifold when piston 85 is moved to the left due to the one-way characteristic of valves 15 and 15a.

When the above cycle is completed, a precise amount of viscous material will flow from supply manifold 11 into conduit 96 of inlet passage member 95, into manifold plate chamber 99 around and through suspended dispensing plate 98 and out through apertures 27 of pattern plate 115 (FIG. 7) in an even pattern and quantity.

It should be noted that the structure of piston 87 is adjustable by thumb screw 90 thereby precisely adjusting the amount of viscous material drawn into, and pumped out by pump piston and cylinder 85 and 81, and similarly, precisely control the amount of fluid flowing out of supply manifold 11 through valve 15a, through manifold plate inlet passage 96 over, around and through diversion plate 98 and chamber 99 and out through apertures 27.

The action of a single such cycle as above described provides and controls the entire precise amount of viscous material to be dispensed and diffusion plate 98 provides an appropriate diffusion and disbursement of the material whereby pattern plate 115 will provide an even and precise quantity of distribution of viscous material downwardly out of pattern plate 115 on to object 22 to which the material is to be applied.

What is claimed is:

1. An apparatus for accurately dispensing a precise quantity of viscous flowable material uniformly in a certain pattern over and onto a given area of an object comprising a supply manifold adapted to transmit said flowable material therethrough and having an inlet and an outlet with a secondary passageway thereto between said inlet and said outlet, said manifold [outlet] *inlet* being connected to a source to receive said material into said manifold, pump means connected to said supply manifold secondary passage for alternately withdrawing a predetermined quantity of said material and forcibly injecting said quantity of said material respectively from and into said manifold, means for operating said pump means, an inlet valve means in said manifold inlet to preclude the expelling of said flowable material from said supply manifold and adapted to open to allow said material to flow into said supply manifold from said source when material is withdrawn from said supply manifold by said pump means, an outlet valve means in said manifold outlet to preclude the intake of said flowable material into said supply manifold and adapted to open to allow said material to flow out of said supply manifold when said material is forcibly injected into said supply manifold by said pump means, a dispensing manifold having an inlet passage opening into a dispensing chamber adapted to receive said material from said normally closed manifold valve when said material is pumped into said supply manifold and opening toward the object to receive said material, and a pattern plate enclosing the opening of said dispensing chamber and positionable over the object and having a pattern of apertures therethrough for dispensing said material in a pattern over and onto the given area of the object, an apertured plate suspended in said dispensing manifold chamber in the path of said material for diffusing said material received from said supply manifold outlet valve to evenly diffuse and disperse said material through the apertures thereof to said pattern plate whereby said pattern plate will accurately and evenly dispense said predetermined precise amount of material in said pattern onto and over the given area of the object when said amount of material is received in said dispensing manifold.

2. Apparatus according to claim 1 wherein said supply manifold has said inlet and outlet thereof in alignment and said passageway thereof extending laterally thereto whereby said pump means will alternately withdraw and inject the material laterally to said inlet and outlet alignment.

3. Apparatus according to claim 1 wherein said pump means comprises a pump cylinder chamber adapted to receive material from said supply manifold passage and a piston reciprocally mounted in said cylinder chamber alternately actuatable away from and toward said source manifold passage to alternately withdraw and inject material into and out of said pump cylinder chamber from said supply manifold, and means for actuating said pump piston in said alternate directions.

4. Apparatus according to claim 3 wherein said pump piston actuating means comprises a cylinder having a sealed piston chamber and a piston reciprocally mounted in said piston chamber and having a piston rod axially slidably mounted in said cylinder and connected to said pump piston for reciprocal movement therewith, and a source of flowable media under pressure in communication with said actuating chamber on both sides of said piston and selectively operable to alternately move said piston in opposite directions to similarly actuate said pump piston.

5. Apparatus according to claim 3 wherein said pump cylinder actuating means comprises a cylinder having a sealed piston chamber and a piston reciprocally mounted in said piston chamber and having a said piston rod axially slidably mounted in said cylinder and connected to said pump piston for reciprocal movement therewith, and a source of flowable media under pressure in communication with said actuating chamber on both sides of said piston and selectively operable to alternately move said piston in opposite directions to similarly actuate said pump piston.

6. Apparatus according to claim 1 wherein said inlet valve comprises an inlet valve body having an outlet opening adapted to pass material therethrough into said supply manifold, an inlet valve plug having a stem shaft slidably mounted in said valve body and biased for normally releasably forcing said plug into engagement with said outlet opening of said inlet body to releasably and normally seal said body opening, and said inlet valve body having a separate passage connecting said source with the outlet opening of said inlet valve body whereby said inlet valve plug will be moved away from said inlet valve outlet opening to open said inlet valve to allow material to flow through said inlet valve body and into said supply manifold when said pump withdraws material from said supply manifold against the bias of said inlet valve plug.

7. Apparatus according to claim 1 wherein said outlet valve comprises an outlet valve body having an outlet opening adapted to pass source material therethrough into said dispensing manifold pattern plate chamber, an outlet valve plug having a stem shaft slidably mounted in said valve body and biased for normally releasably forcing said plug into engagement with said outlet opening of said inlet body to releasably and normally seal said body opening, and said outlet valve body having a separate passage connecting said source with the outlet opening of said outlet valve body whereby said outlet valve plug will be moved away from said outlet valve outlet opening to open said outlet valve to allow material to flow through said outlet valve body and through said passage into the pattern plate chamber when said pump injects material into said source manifold against the bias of said plug.

8. Apparatus according to claim 6 wherein said outlet valve comprises an outlet valve body having an outlet opening in passage communication with said dispensing manifold pattern plate chamber, an outlet valve plug having a stem shaft slidably mounted in said valve body and biased for normally releasably forcing said plug into engagement with said inlet body adjacent said outlet opening to releasably and normally seal said body opening, and said outlet valve body having a separate passage connecting said source with the outlet opening of said outlet valve body whereby said outlet valve plug will be moved away from said outlet valve outlet opening to open said outlet valve to allow material to flow through said outlet valve body and through said passage into the pattern plate chamber when said pump injects material into said source manifold against the bias of said plug.

9. Apparatus according to claim 8 wherein said pump means comprises a pump cylinder chamber adapted to receive material from said supply manifold passage and a piston reciprocally mounted in said cylinder chamber alternately actuatable away from and toward a manifold passage to alternately withdraw and inject material into and out of said pump cylinder chamber from said supply manifold, means for actuating said pump piston in said alternate directions, and said pump cylinder actuating means comprises a cylinder having a sealed piston chamber and a piston and attached piston rod with said piston reciprocally mounted in said piston chamber with said piston rod axially slidably mounted in said cylinder and operably connected to said pump piston for reciprocal movement therewith, and a source of flowable media under said actuating chamber on both longitudinal sides of said piston and selectively operable to alternately move said piston in opposite longitudinal directions to similarly actuate said pump piston whereby material is pumped out of end into said source manifold.

10. Apparatus according to claim 4 wherein said pump cylinder actuating means is adjustable to limit the movement of said piston thereof and the corresponding amount of material pumped by said pump means.

11. Apparatus according to claim 10 wherein said pattern plate chamber has an opening width greater than the diameter of said pump cylinder chambers whereby the linear movement of said cylinders required to pump a given amount of material into the pattern plate chamber is greater than the linear movement required to move the same amount of the material through said pattern plate chamber whereby linear adjustment in the limits of movement of said pump cylinder will result in a lesser linear and more precise movement of the material in the pattern plate chamber.

12. Apparatus according to claim 2 wherein said pump means comprises a pump cylinder chamber adapted to receive material from said supply manifold passage and a piston reciprocally mounted in said cylinder chamber alternately actuatable away from and toward said source manifold passage to alternately withdraw and inject material into and out of said pump cylinder chamber from said supply manifold, means for actuating said pump piston in said alternate directions, and said pump cylinder actuating means comprises a cylinder having a sealed piston chamber and a piston and attached piston rod with said piston reciprocally mounted in said piston chamber with said piston rod axially slidably mounted in said cylinder and operably connected to said pump piston for reciprocal movement therewith, and a source of flowable media under pressure in communication with said actuating chamber on both longitudinal sides of said piston and selectively operable to alternately move said piston in opposite longitudinal directions to similarly actuate said pump piston whereby material is pumped out of end into said source manifold.

13. Apparatus according to claim 4 wherein said pump cylinder actuating means is adjustable to limit the movement of said piston thereof and the corresponding amount of material pumped by said pump means.

14. Apparatus according to claim 10 wherein said pattern plate chamber has an opening width greater than the diameter of said pump cylinder chambers whereby the linear movement of said cylinders required to pump a given amount of material into the pattern plate chamber is greater than the linear movement required to move the same amount of the material through said pattern plate chamber whereby linear adjustment in the limits of movement of said pump cylinder will result in a lesser linear and more precise movement of the material in the pattern plate chamber.

15. Apparatus according to claim 6 wherein said inlet valve body and said outlet valve body are provided with converging surfaces forming the outlet openings thereof and the seat for said plugs thereof to provide a closing of said valve opening of said valves.

16. Apparatus according to claim 15 wherein plugs thereof have a tapered surface on the inlet side thereof adapted for engaging said converging surfaces of respective valve bodies at the convergence thereof to close said respective valves.

17. Apparatus according to claim 16 wherein said converging surfaces converge at an acute angle for providing a line contact between said plugs and respective valve bodies for penetrating the material of said source when said plugs engage the respective valve bodies to aid in the closing of said valves.

*18. A dispensing manifold for delivering a predetermined quantity of viscous flowable material from an upstream source of supply to a downstream object, the dispensing manifold comprising:*

*a dispensing chamber capable of receiving a quantity of viscous flowable material from the source of supply;*

*a pattern plate at the downstream end of the dispensing chamber, the pattern plate having a plurality of passages therethrough to allow passage of the viscous flowable material from the dispensing chamber to the object; and*

*diffuser means in the dispensing chamber upstream of the pattern plate for distributing the viscous flowable material about the pattern plate, the diffuser means having a plurality of passages therethrough;*

*wherein the viscous flowable material is dispensed substantially evenly upon at least a portion of the object.*

*19. The dispensing manifold of claim 18 wherein the diffuser means is suspended at or near the center of the dispensing chamber.*

*20. The dispensing manifold of claim 18 wherein the diffuser means comprises a diffuser plate.*

*21. The dispensing manifold of claim 18 wherein the passages through the diffuser means are apertures.*

*22. The dispensing manifold of claim 18 wherein the pattern plate is wider than the diffuser means.*

*23. The dispensing manifold of claim 18 in combination with a supply means, the supply means including a supply manifold and means for conveying the viscous flowable material between the supply manifold and the dispensing chamber.*

*24. The dispensing manifold and supply means of claim 23 wherein the supply means further comprises a reciprocating pump to repeatedly move a predetermined quantity of viscous flowable material from the supply manifold to the dispensing chamber.*

*25. The dispensing manifold and supply means of claim 24 wherein the reciprocating pump is adjustable to thereby vary the predetermined quantity of viscous flowable material moved from the supply manifold to the dispensing chamber.*

*26. The dispensing manifold and supply means of claim 23 wherein the viscous flowable material is conveyed between the supply manifold and the dispensing chamber through an inlet at the upstream end of the dispensing chamber.*

*27. The dispensing manifold and supply means of claim 26 wherein the pattern plate is wider than the diffuser means and the diffuser means is wider than the inlet.*

*28. A dispensing manifold for delivering a predetermined quantity of viscous flowable material from an upstream source of supply to a downstream object, the dispensing manifold comprising:*

*a dispensing chamber capable of receiving a quantity of viscous flowable material from the source of supply the dispensing chamber receiving the viscous flowable material at its upstream end through an inlet;*

*a pattern plate at the downstream end of the dispensing chamber, the pattern plate having a plurality of passages therethrough to allow passage of the viscous flowable material from the dispensing chamber to the object, the pattern plate being wider than the inlet; and*

*diffuser means in the dispensing chamber upstream of the pattern plate for distributing the viscous flowable material about the pattern plate, the diffuser means being wider than the inlet, and the diffuser means having a plurality of passages therethrough;*

*wherein the viscous flowable material is substantially uniformly dispensed upon at least a portion of the object.*

*29. The dispensing manifold of claim 28 wherein the diffuser means is suspended at or near the center of the dispensing chamber.*

*30. The dispensing manifold of claim 28 wherein the pattern plate is wider than the diffuser means.*

*31. The dispensing manifold of claim 28 wherein the diffuser means comprises a diffuser plate.*

*32. The dispensing manifold of claim 28 wherein the passages through the diffuser means are apertures.*

*33. The dispensing manifold of claim 28 in combination with a supply means, the supply means including a supply manifold and means for conveying the viscous flowable material between the supply manifold and the inlet at the upstream end of the dispensing chamber.*

*34. The dispensing manifold and supply means of claim 33 wherein the supply means further comprises a reciprocating pump to repeatedly move a predetermined quantity of viscous flowable material from the supply manifold to the dispensing chamber.*

*35. The dispensing manifold and supply means of claim 34 wherein the reciprocating pump is adjustable to thereby vary the predetermined quantity of viscous flowable material moved from the supply manifold to the dispensing chamber.*

*36. A dispensing apparatus for delivering a predetermined quantity of viscous flowable material from an upstream source of supply to a downstream object comprising:*

*a supply means,*

*the supply means including a supply manifold;*

*a dispensing manifold,*

*the dispensing manifold including a dispensing chamber capable of receiving a quantity of viscous flowable material,*

*a pattern plate at the downstream end of the dispensing chamber, the pattern plate having a plurality of passages therethrough to allow passage of the viscous flowable material from the dispensing chamber to the object, and*

*diffuser means in the dispensing chamber upstream of the pattern plate for distributing the viscous flowable material about the pattern plate, the diffuser means having a plurality of passages therethrough; and*

*means for conveying the viscous flowable material between the supply manifold and the dispensing chamber;*

*wherein the viscous flowable material is dispensed substantially evenly upon at least a portion of the object.*

*37. The dispensing manifold of claim 36 wherein the diffuser means is suspended at or near the center of the dispensing chamber.*

*38. The dispensing apparatus of claim 36 wherein the diffuser means comprises a diffuser plate.*

*39. The dispensing manifold of claim 36 wherein the passages through the diffuser means are apertures.*

*40. The dispensing apparatus of claim 36 wherein the pattern plate is wider than the diffuser means.*

*41. The dispensing apparatus of claim 36 wherein the supply means further comprises a reciprocating pump to repeatedly move a predetermined quantity of viscous flowable material from the supply manifold to the dispensing chamber.*

*42. The dispensing apparatus of claim 41 wherein the reciprocating pump is adjustable to thereby vary the predetermined quantity of viscous flowable material moved from the supply manifold to the dispensing chamber.*

*43. The dispensing apparatus of claim 36 wherein the viscous flowable material is conveyed between the supply manifold and the dispensing chamber through an inlet at the upstream end of the dispensing chamber.*

*44. The dispensing apparatus of claim 43 wherein the pattern plate is wider than the diffuser means and the diffuser means is wider than the inlet.*

*45. A dispensing apparatus for delivering a predetermined quantity of viscous flowable material from an upstream source of supply to a downstream object comprising:*

*a supply means,*

*the supply means including a supply manifold;*

*a dispensing manifold,*

*the dispensing manifold including a dispensing chamber capable of receiving a quantity of viscous flowable material, the dispensing chamber receiving the viscous flowable material at its upstream end through an inlet,*

*a pattern plate at the downstream end of the dispensing chamber, the pattern plate having a plurality of passages therethrough to allow passage of the viscous flowable material from the dispensing chamber to the object, the pattern plate being wider than the inlet, and*

*diffuser means in the dispensing chamber upstream of the pattern plate for distributing the viscous flowable material about the pattern plate, the diffuser means being wider than the inlet, and the diffuser means having a plurality of passages therethrough; and*

*means for conveying the viscous flowable material between the supply manifold and the inlet at the upstream end of the dispensing chamber;*

*wherein the viscous flowable material is substantially uniformly dispensed upon at least a portion of the object.*

* * * * *